United States Patent [19]

Hunt

[11] Patent Number: 4,846,288

[45] Date of Patent: Jul. 11, 1989

[54] HYDRAULICALLY POWERED ROTARY PERCUSSIVE MACHINES

[75] Inventor: Clive W. Hunt, Randburg, South Africa

[73] Assignee: The Steel Engineering Company Limited, Roodepoorts, South Africa

[21] Appl. No.: 41,517

[22] Filed: Apr. 23, 1987

[30] Foreign Application Priority Data

Apr. 24, 1986 [ZA] South Africa ........................ 86/3074

[51] Int. Cl.$^4$ .............................................. B23B 45/16

[52] U.S. Cl. ........................................ 173/105; 91/532

[58] Field of Search ......................... 173/104, 105, 109; 91/532

[56] References Cited

U.S. PATENT DOCUMENTS

| | | | |
|---|---|---|---|
| 1,572,371 | 2/1926 | Smith | 91/532 X |
| 3,385,378 | 5/1968 | Weber et al. | 173/105 |
| 4,430,926 | 2/1984 | Wallace | 173/105 |

FOREIGN PATENT DOCUMENTS

| | | | |
|---|---|---|---|
| 1097331 | 3/1981 | Canada | 173/109 |

*Primary Examiner*—Frank T. Yost
*Assistant Examiner*—James L. Wolfe
*Attorney, Agent, or Firm*—Wegner & Bretschneider

[57] ABSTRACT

A single supply line feeds hydraulic fluid under pressure to a hydraulic percussive machine with a percussion motor and a rotation motor. A constant flow device is positioned between the supply line and the rotation motor.

6 Claims, 4 Drawing Sheets

HYDRAULICALLY POWERED ROTARY PERCUSSIVE MACHINES

BACKGROUND TO THE INVENTION

This invention relates to hydraulically powered rotary percussive machines of the kind which are used as rock drilling machines.

Hydraulic percussive drilling machines are known in which a piston is caused to reciprocate to and fro and a rotation motor is arranged to rotate a chuck holding the tool upon which the piston is caused to impact—see U.S. Pat. Nos. 4,006,783 and 4,430,926.

In U.S. Pat. No. 4,006,783 the percussion motor and the rotation motor are on separate hydraulic circuits. This necessitates the use of four hydraulic hoses between the hydraulic power pack and the machine. In U.S. Pat. No. 4,430,926 the percussion motor and the rotation motor are on a common feed with only two hoses between the power pack and the machine. In the latter case the feed passes through at least one valve of the constant volume flow dividing type which establishes priority of flow to the rotation motor and bypass flow to the percussion motor after a predetermined constant flow to the rotation motor has been established. These constant volume flow dividing priority valves are expensive and difficult to fit in the space normally available in a rock drill casing.

SUMMARY OF THE INVENTION

The present invention provides a hydraulic drilling machine having an impact motor with a piston which can be caused to reciprocate to and fro by hydraulic fluid under pressure, a rotation motor which can be caused to rotate by the fluid, a chuck for holding a tool upon which the piston can be caused to impact, the chuck being rotated by the rotation motor, with the improvement of a common hydraulic supply line for the impact motor and the rotation motor, and a constant flow device positioned between the supply line and the rotation motor.

DESCRIPTION OF AN EMBODIMENT

Figure 1:
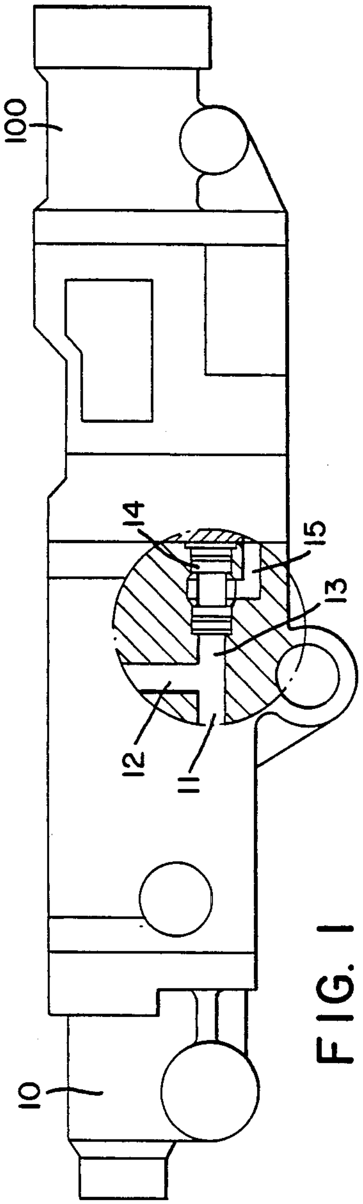
FIG. 1 is a side view of a rock drilling machine with a portion broken away.

In the illustrated embodiment there is a rock drilling machine having a back end 10 with a control valve (21 in FIG. 5) for hydraulic fluid. The fluid flows from the valve along a conduit 11. The conduit 11 branches into conduits 12 and 13. The conduit 13 leads to a constant flow device 14 controlling flow in a passage 15 leading to a rotation motor (not shown) while the conduit 12 feeds the impact motor.

Figure 2:
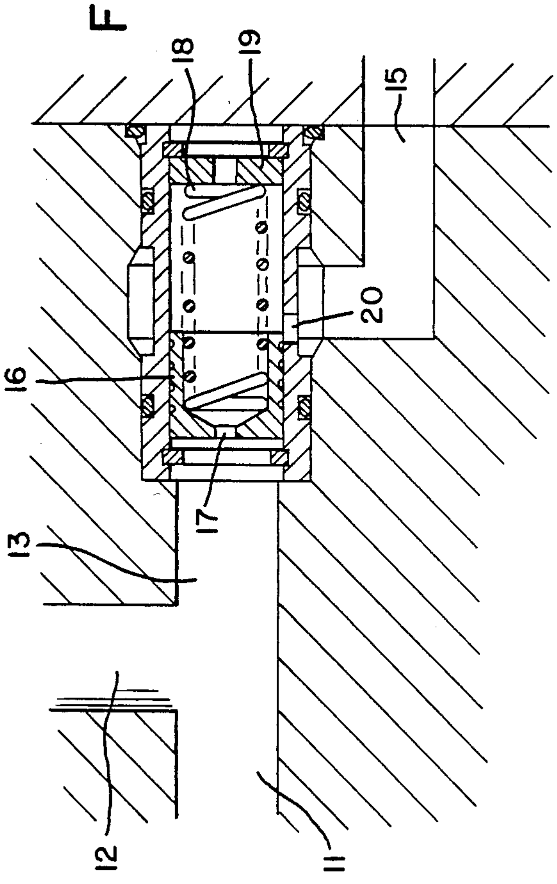
FIG. 2 is an enlarged sectional view of the broken away portion in FIG. 1.

As can be seen from FIG. 2 the constant flow device 14 comprises a sleeve 16 formed with an orifice 17. The sleeve 16 is acted upon by a compression spring 18 which can be adjusted by means of a shim or spacer 19. The sleeve 16 controls flow through an orifice 20. The spring load is adjusted so that a predetermined pressure drop is maintained across the orifice 17, thus causing a constant flow through the orifice 20 and along the passage 15.

Figure 3:
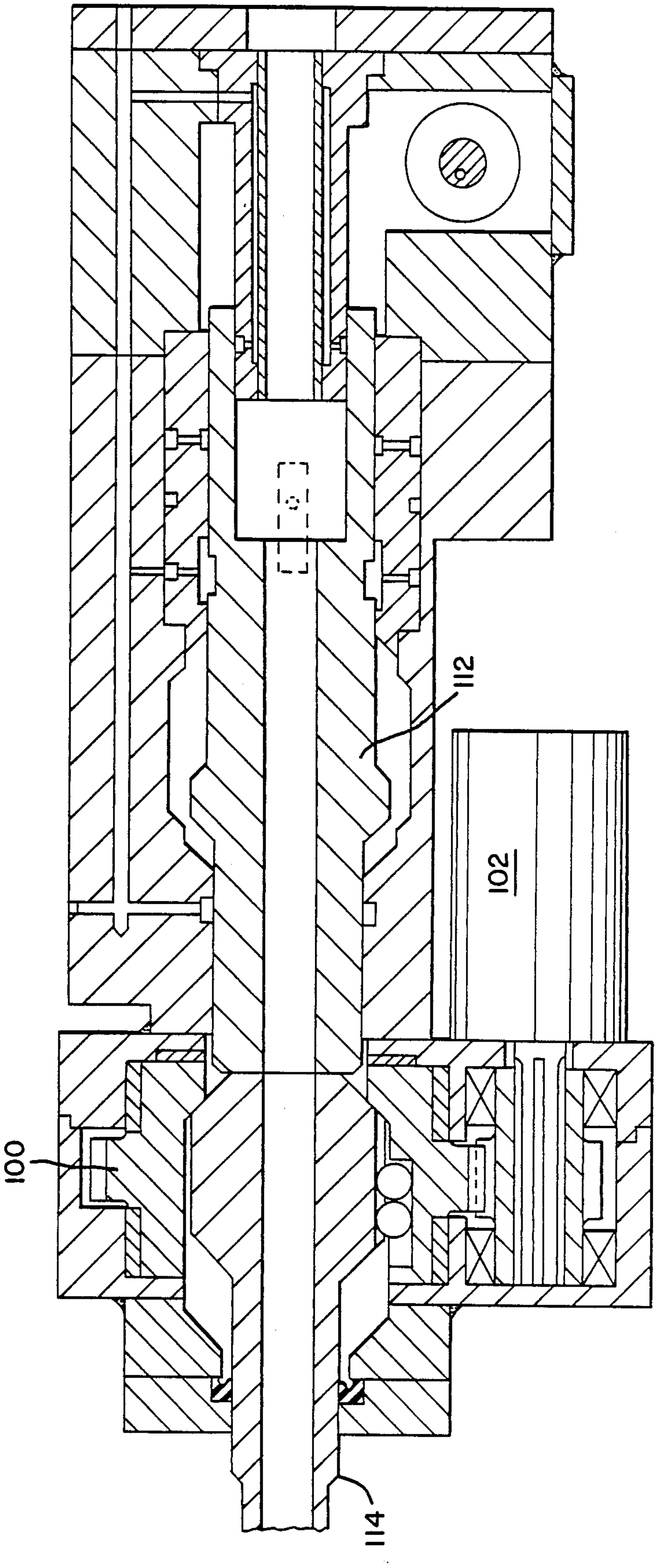
FIG. 3 is a sectional view of a rock drilling machine of the prior art.
Figure 4:
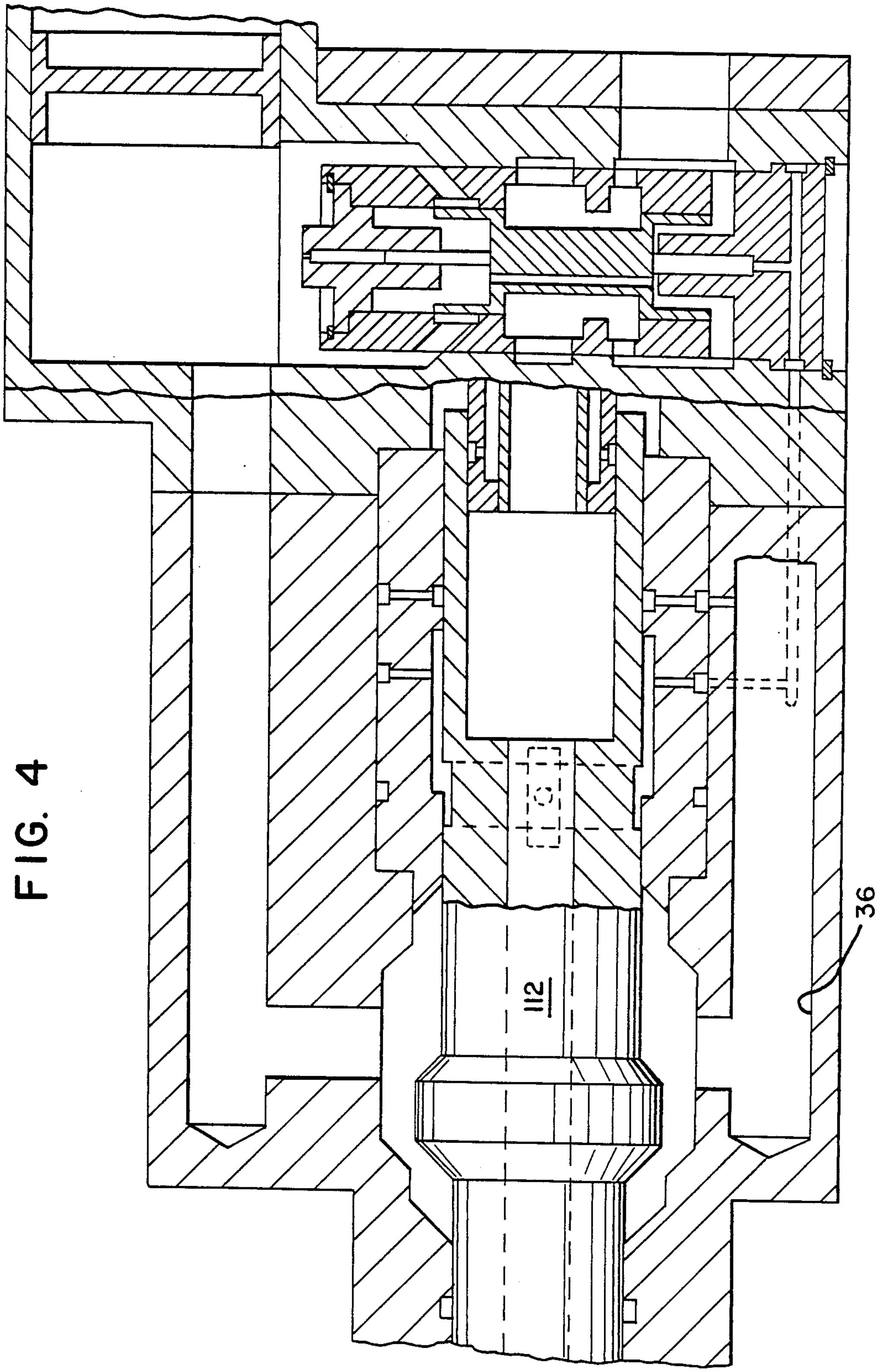
FIG. 4 is a sectional view in another plane of the rock drilling machine of FIG. 3.

FIGS. 3 and 4 are taken from the well-known U.S. Pat. No. 3,701,386 to Feucht, and show several other elements which make up a part of the present invention. Specifically, the rock drilling machine in FIGS. 3 and 4 includes an impact motor with a piston 112 which can be caused to reciprocate to and fro by hydraulic fluid under pressure. A chuck 100 holds a tool 104. The tool 104 is impacted by the reciprocating piston 112, and is also rotated by the action of the rotation motor 102 on chuck 100.

As seen in FIG. 4, fluid to the impact motor flows along conduit 36. This conduit is a continuation of the conduit 12 shown in FIGS. 1 and 2. Conduit 15 from FIGS. 1 and 2 leads to the rotation motor 102.

Figure 5:
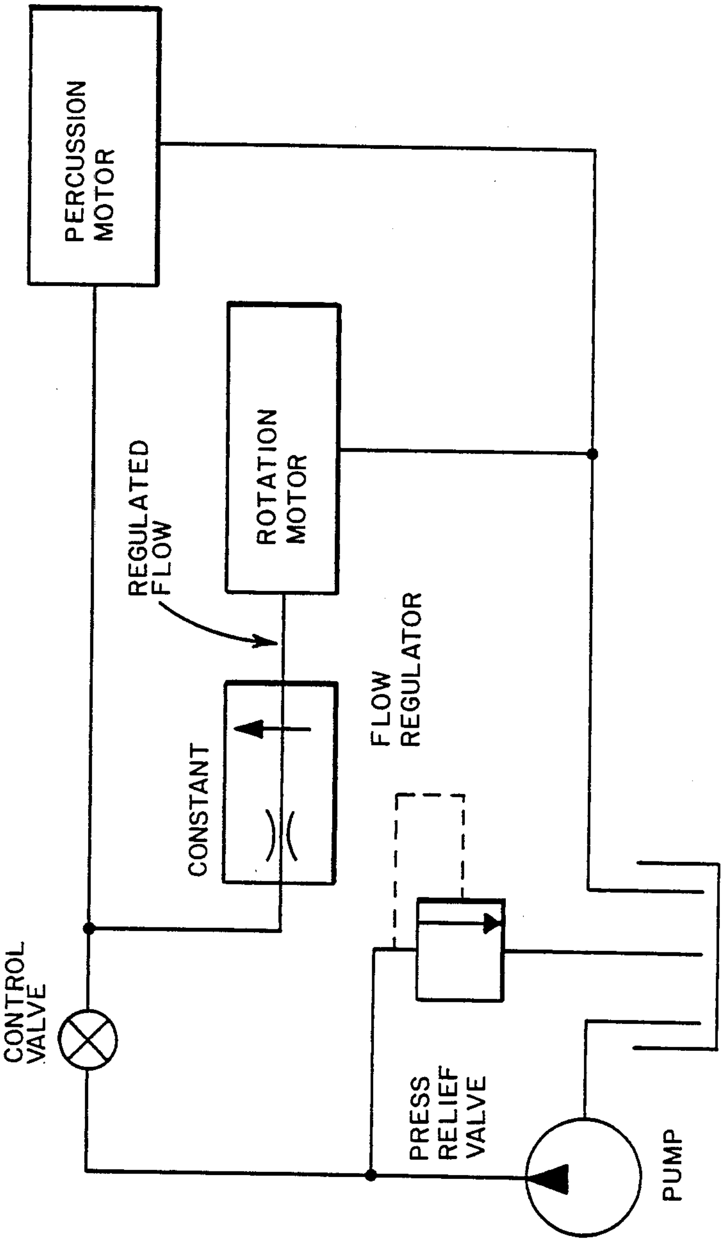
FIG. 5 is a block diagram showing the operation of a rock drilling machine according to the present invention.
Figure 3:
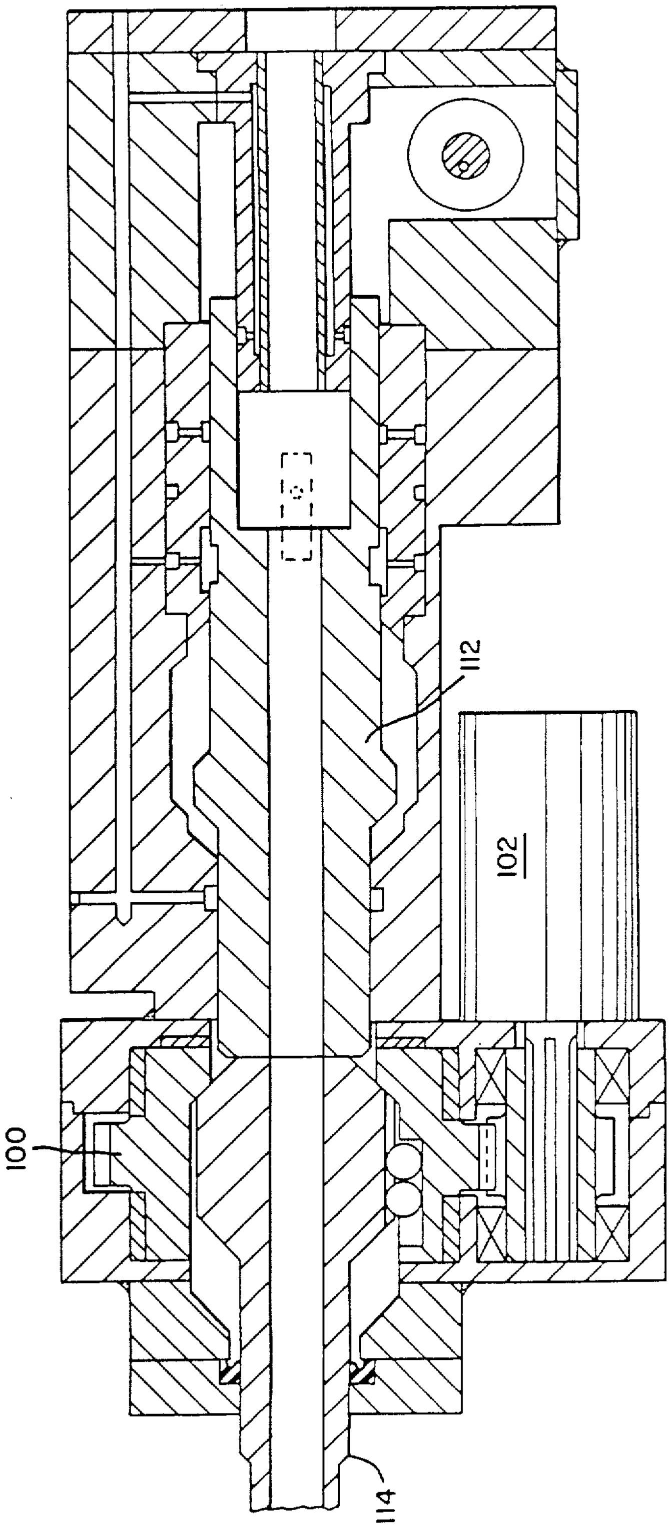
FIG. 3 PRIOR ART
Figure 4:
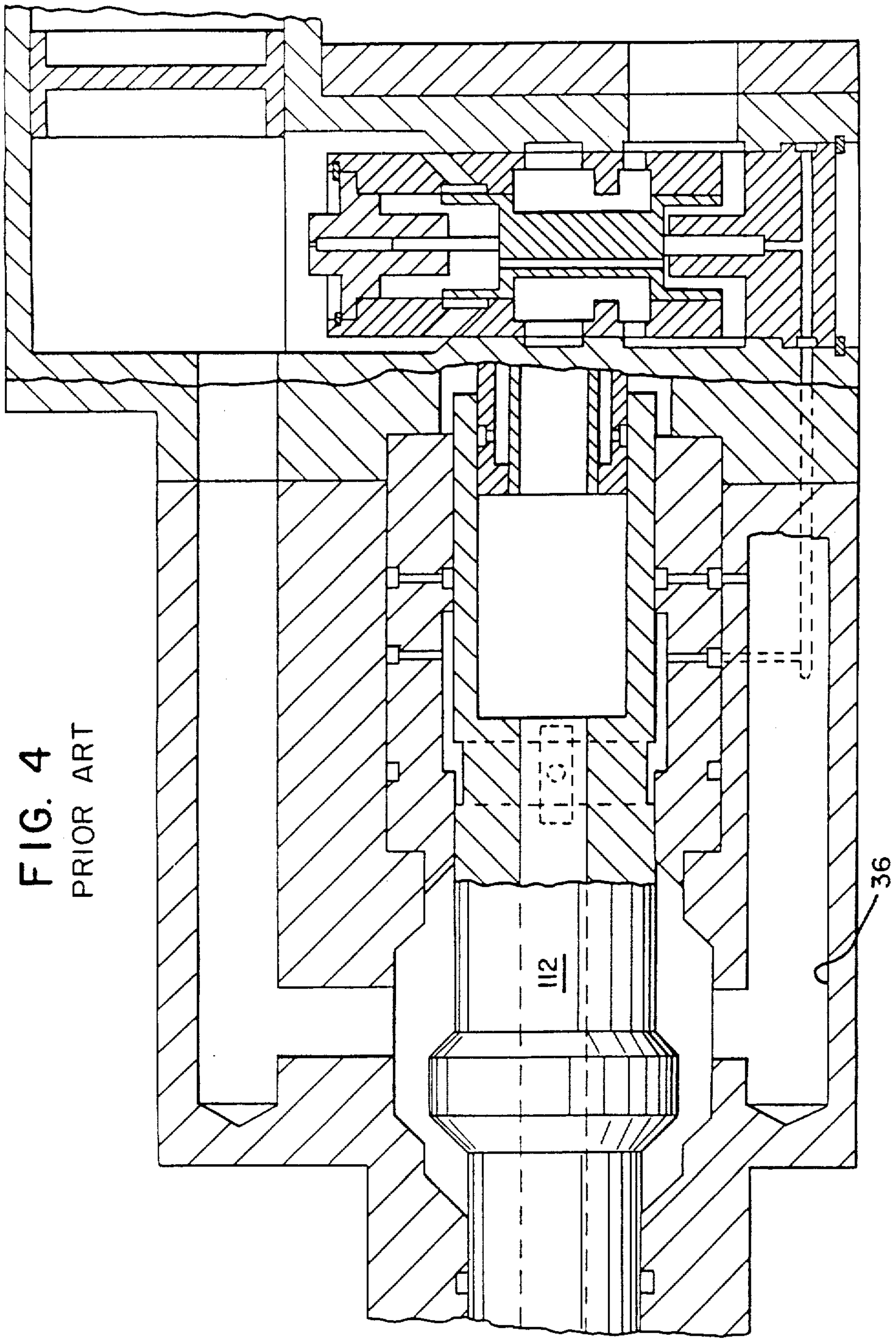
FIG. 4 PRIOR ART
Figure 5:
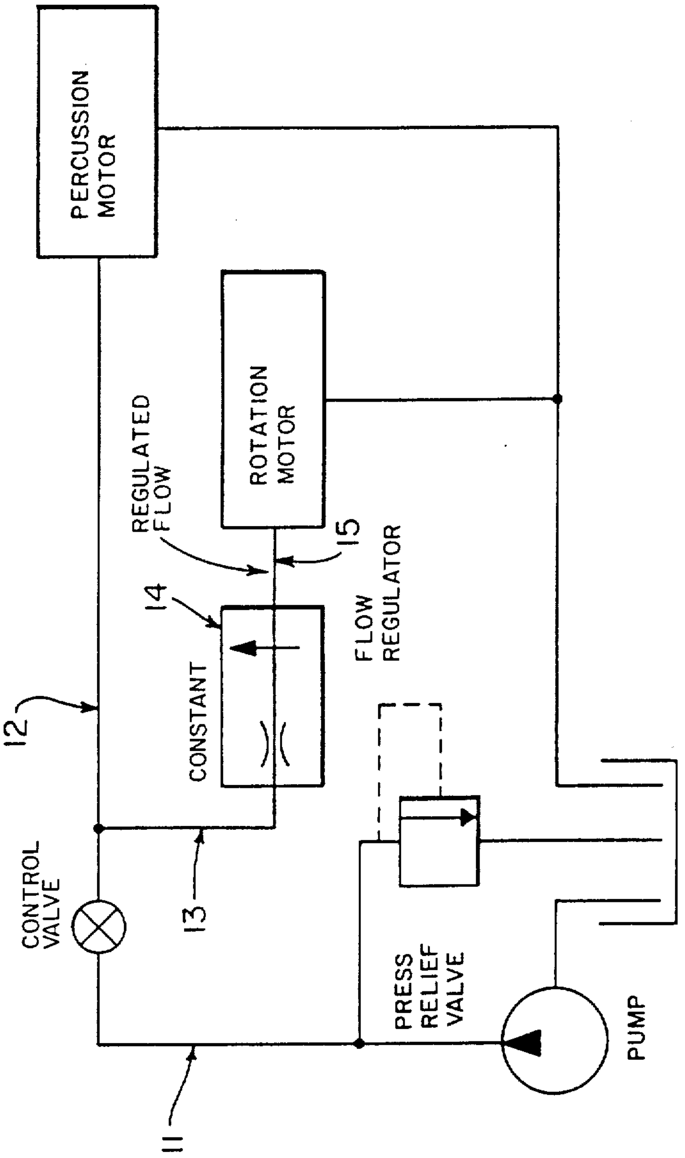

FIG. 5 is a schematic view of the hydraulic system of the rock drilling machine according to the present invention, and shows the conduits 11–13 and 15 leading to the percussion and rotation motors. The constant flow device 14 is shown in the conduit leading to the rotation motor.

In use a useful operating characteristic is achieved. Even though there is a constant flow to the rotation motor, drilling does not cease when a drill bit gets stuck in a hole. When the forward feed is reduced, the percussive impact causes the drill bit to become loose when it sticks and eventually the rotation motor causes the bit to rotate once more.

I claim:

1. A hydraulic drilling machine comprising an impact motor with a piston which can be caused to reciprocate to and fro by hydraulic fluid under pressure, a rotation motor which can be caused to rotate by the fluid, a chuck for holding a tool upon which the piston can be caused to impact, the chuck being rotated by the rotation motor, a common hydraulic supply line for the impact motor and the rotation motor, and a constant flow device positioned between the supply line and the rotation motor, said constant flow device supplying fluid only to said rotation motor.

2. The machined claimed in claim 1 in which the constant flow device comprises a fixed orifice and a variable orifice in series, and a spring for adjusting the variable orifice in response to changes of pressure through the fixed orifice, the spring acting to keep a predetermined pressure drop across the fixed orifice.

3. A hydraulic drilling machine, comprising:

an impact motor having a piston which is caused to reciprocate to and fro by hydraulic fluid under pressure;

a rotation motor which can be caused to rotate by the hydraulic fluid;

a chuck for holding a tool upon which the piston can be caused to impact, the chuck being rotated by said rotation motor;

a common hydraulic supply line supplying hydraulic fluid to both said rotation motor and said impact motor; and a constant flow device positioned between said common hydraulic supply line and said rotation motor which supplies fluid only to said rotation motor;

wherein hydraulic fluid supplied to the impact motor is at essentially equal pressure to hydraulic fluid supplied to the constant flow device.

4. The machine claimed in claim 3, wherein said constant flow device comprises a fixed orifice and a variable orifice in series, and a spring for adjusting the variable orifice in response to changes of pressure through the fixed orifice, the spring acting to keep a predetermined pressure drop across the fixed orifice.

5. A hydraulic driling machine, comprising:

an impact motor having a piston which is caused to reciprocate to and fro by hydraulic fluid under pressure;

a rotation motor which can be caused to rotate by the hydraulic fluid;

a chuck for holding a tool upon which the piston can be caused to impact, the chuck being rotated by said rotation motor;

a common hydraulic supply line which branches into a rotation motor supply line which supplies hydraulic fluid to said rotation motor and an impact motor supply line which supplies hydraulic fluid to said impact motor; and a constant flow device positioned in said rotation motor supply line which supplies fluid only to said rotation motor;

wherein hydraulic pressure in said impact motor supply line is essentially equal to hydraulic pressure in said rotation motor supply line upstream of said constant flow device.

6. The machine claimed in claim 5, wherein said constant flow device comprises a fixed orifice and a variable orifice in series, and a spring for adjusting the variable orifice in response to changes of pressure through the fixed orifice, the spring acting to keep a predetermined pressure drop across the fixed orifice.

* * * * *

UNITED STATES PATENT AND TRADEMARK OFFICE

CERTIFICATE OF CORRECTION

PATENT NO. : 4,846,288

DATED : July 11, 1989

INVENTOR(S) : Clive Wilfred Hunt

It is certified that error appears in the above-identified patent and that said Letters Patent is hereby corrected as shown below:

Substitute the attached Figures 3, 4, and 5 for Figures 3, 4, and 5 of the patent.

Signed and Sealed this

Eighth Day of September, 1992

*Attest:*

DOUGLAS B. COMER

*Attesting Officer*

*Acting Commissioner of Patents and Trademarks*